United States Patent Office

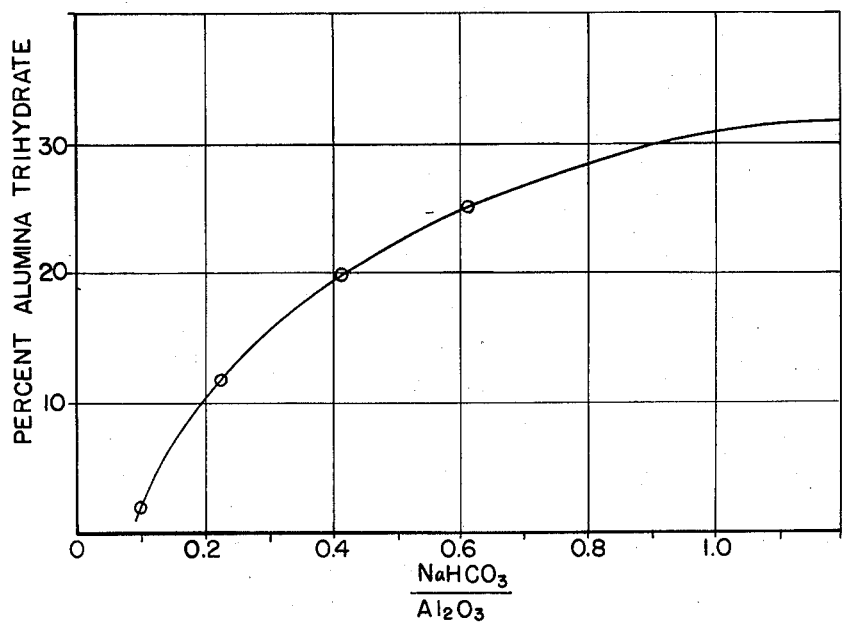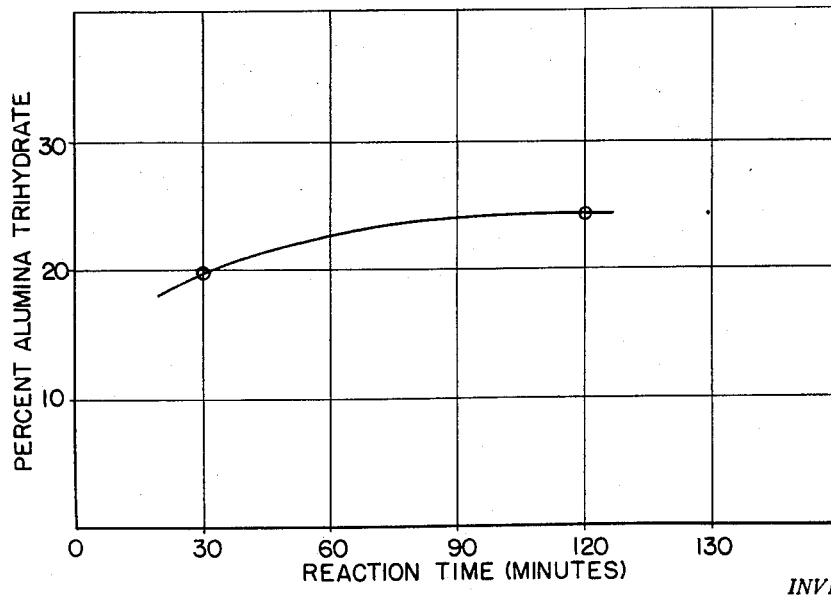

2,943,065
METHOD FOR PREPARING ALUMINA COMPOSITIONS

David G. Braithwaite, Chicago, Ill., assignor to Nalco Chemical Company, Chicago, Ill., a corporation of Delaware Filed Dec. 8, 1955, Ser. No. 551,931

4 Claims. (Cl. 252—463)

This invention relates to a method for preparing alumina compositions, more particularly alumina compositions containing alumina trihydrate.

It is well known in the art to use compositions of alumina as carriers or extenders for various types of catalysts. Such compositions are dried hydrogels obtained by treating hydrosols of alumina with various reagents followed by washing and drying. It is also well known that alumina hydrogels have various physical forms and that the alumina exists in the hydrogel as the monohydrate, dihydrate and trihydrate. Combinations of these various physical forms with the mono-, di-, and trihydrates can be prepared, each displaying a particular advantage as a catalyst support in a given catalytic reaction. Some particular combinations are useful for fluid hydroforming reactions wherein the alumina is used as a base for molybdenum oxide and the same combinations can be used as a base for hydrogenation-desulfurization reactions wherein the alumina is used as a base for cobalt oxide and molybdenum oxide catalysts. However, these alumina compositions have the disadvantage that they do not lend themselves to extrusion and must be tableted for use in fixed bed catalytic operations.

It has been found that alumina compositions containing alumina trihydrate are particularly suitable for extrusion. However, for certain uses as catalyst supports, such as supports for hydrogenation-desulfurization catalysts, it is necessary that the alumina trihydrate be present only in a limited amount. Conventional methods of preparing alumina trihydrate are not effective where it is necessary to control the amount of trihydrate formed.

One of the objects of the invention is to provide a method for preparing an alumina composition containing alumina trihydrate of the gelatinous type in which method the amount of trihydrate formed is controllable.

Another object of the invention is to provide a method for preparing a gelatinous alumina composition containing a limited amount of gelatinous alumina trihydrate and possessing characteristics making it suitable for extrusion.

A further object of the invention is to provide a method for preparing a gelatinous alumina composition containing from about 1% to about 75% (preferably about 10% to about 60%) of alumina trihydrate.

Another object of the invention is to provide a method for preparing an extrudible alumina composition which possesses characteristics necessary for use as a catalyst support. Other objects will appear hereinafter.

In accordance with the invention, a gelatinous alumina trihydrate is produced by reacting a water soluble aluminate and an alkali metal bicarbonate in aqueous solution.

The best mode contemplated for the practice of the invention to produce an extrudible alumina composition involves the following steps:

(1) An alkali metal bicarbonate and a water soluble aluminate, e.g., sodium aluminate or calcium aluminate, are admixed in aqueous solution in proportions corresponding to about 0.1 to about 1.5 (preferably about 0.2 to about 1.2) parts by weight of the alkali metal bicarbonate, calculated as $NaHCO_3$, per part of soluble aluminate, calculated as $Al_2O_3$. The amount of water to dilute the reactants is preferably sufficient to give a combined solids content of about 1% to about 10% by weight of the solution.

(2) The amount of alkali metal bicarbonate employed must be controlled since it has been found that the greater the amount used, within the aforesaid range, the greater is the amount of gelatinous alumina trihydrate formed. This is illustrated in the curve of Fig. 1 wherein the percent of gelatinous alumina trihydrate formed, for a given time of admixing, is plotted as a function of the ratio of sodium bicarbonate to aluminum oxide.

(3) The admixing of the reactants is preferably accomplished with agitation over a time period of about 15 minutes to about 180 minutes. For example, the reactants may be added over a period of 30 minutes and then the mixture agitated for an additional 30 minutes. The time period of admixture must be controlled since it has been found that the longer the time period the greater is the amount of trihydrate formed. This is illustrated in the curve of Fig. 2 wherein the percent of alumina trihydrate formed is plotted as a function of the reaction time in minutes.

(4) The pH is adjusted to the acid side by adding an acid (e.g., sulfuric, hydrochloric or nitric) which forms soluble aluminum salts or an acidic salt, e.g., aluminum sulfate, which is compatible with the reaction mixture. Aluminum sulfate is preferably used because it increases the alumina content of the resultant product. The addition of the acidic component is preferably made gradually or in increments with agitation over a time period of about 15 minutes to about 40 minutes. The amount of the acidic additive is preferably sufficient to reduce the pH to 5 to 6.

(5) The pH of the slurry obtained from step 4 is adjusted to about 9 to 9.5, and the solid material in the slurry separated out, such as by filtration. This readjustment of the pH to the alkaline side is preferably accomplished by adding an alkaline aluminate, although other compatible alkaline substances, e.g., sodium hydroxide, can be used. The use of the aluminate has the advantage again of increasing the alumina content of the product. The solid material is then washed and dried to yield the final product.

The addition of aluminum salts in steps 4 to 5 should take into account the amount of aluminate used in step 1 and the weight ratio of bicarbonate, calculated as $NaHCO_3$, to aluminum salts, calculated as $Al_2O_3$, should be within the range of 0.1 to 1.5, preferably 0.1 to 0.6.

The washed solid material obtained in step 5, usually obtained as a filter cake, should be dried at a maximum particle temperature of 300° F. to avoid conversion of the trihydrate to mono- or dihydrates. The drying is preferably effected at 150° to 300° F. by a process in which the particles to be dried and a hot air stream are moving in the same direction for the entire drying period. This is usually referred to as concurrent drying as distinguished from countercurrent drying or drying of the type carried out in a cyclone apparatus. Concurrent drying has the advantage for the present invention that it gives large particles an opportunity to dry before they can adhere to the walls of the drier or to other particles.

The invention will be further illustrated but is not limited by the following examples in which quantities are stated in parts by weight unless otherwise indicated.

Example 1

To 2000 cc. of solution containing 223 cc. of 35% sodium aluminate was added 84 grams of sodium bicarbonate. The addition was accomplished over a period of 30 minutes at a temperature of 92° F. The solution was stirred for an additional hour and then 2820 cc. of 2.8% alum (aluminum sulfate) solution was added in a 30-minute period. The final pH of the slurry was about 9.2. The solution was filtered and the filter cake dried and washed. The trihydrate concentration in the purified and dried alumina was 59% of which 54% was of the Bayerite type.

*Example II*

To a solution of 144 cc. of 38% sodium aluminate solution and 1200 cc. of water at 90° F. was added 28 grams of sodium bicarbonate. The mixture was stirred for one hour and then 2025 cc. of 2.8% alum solution was added in 25 minutes. The final adjusted pH was 9.2, and the final temperature was 80° F. After filtering, washing and drying, the final product was found to contain 20% trihydrate.

*Example III*

To illustrate the reproducibility of results obtained by the process of the invention, the following procedure was conducted in triplicate. To 400 cc. of an aqueous solution containing 28 grams of sodium bicarbonate was added a dilute aluminate solution (144 cc. of 38% sodium aluminate in 1200 cc. of water at 90° F.) during a 30-minute period. The resulting mixture was stirred for an additional half hour. To this mixture was added 2000 cc. of 2.8% alum solution over a 20-minute period. The pH of the slurry was adjusted to 9.2 by adding 38% sodium aluminate solution. The final temperature was 80° F. After filtering, washing and drying, as described in Example I, the three products obtained by separate but identical procedures were found to contain alumina trihydrate in amounts of 18%, 18% and 16%.

*Example IV*

To further illustrate the reproducibility of results obtained by the process of the invention, the following procedure was conducted in triplicate. To a solution of 0.197 gallon of 38% sodium aluminate in 1.63 gallons of water was added, over a 30-minute period, a solution prepared by dissolving 0.32 pound of sodium bicarbonate in 0.43 gallon of water. After 30 minutes of additional agitation, a solution of aluminum sulfate, prepared by diluting 0.422 gallon of 25% aluminum sulfate solution with 1.52 gallons of water, was added over a 20-minute period. The pH of the slurry was between 5.5 and 6.0. To this slurry was added dilute sodium aluminate (0.064 gallon of 38% aluminate diluted with 0.22 gallon of water) to adjust the batch to a final pH of between 9.2 and 9.5. The temperature of the batch was 84° F. The slurry was heated to 130° F. and then filtered to concentrate the gel. The filter cake was given a carbonate-acid treatment and washed with 12 gallons of water to remove impurities, after which the purified product was dried. The percent contents of $Al_2O_3.3H_2O$ were 21, 20 and 19. Of each of these values the percent Bayerite were respectively 55, 51 and 49. In each case the $Na_2O$ content was 0.11%. Sulfate impurities were present in each case to the extent of 1.53%, 1.50% and 1.25%, respectively. In all three cases $SiO_2$ was present only in trace amounts.

*Example V*

To a solution of 0.197 gallon of 38% sodium aluminate solution and 1.63 gallons of water was added, over a 30-minute period, a solution prepared by dissolving 0.08 pound of sodium bicarbonate in 0.11 gallon of water. After further agitation for 30 minutes, a solution of aluminum sulfate, prepared by diluting 0.40 gallon of 25% aluminum sufate solution with 1.50 gallons of water, was added over a 20-minute period. The pH of the resulting slurry was between 5.5 and 6.0. To this slurry was added dilute sodium aluminate (0.053 gallon of 38% sodium aluminate diluted with 0.184 gallon of water) to adjust the batch to a final pH of 9.2 to 9.5. The temperature of the batch was 82° F. The slurry was heated to 125° F. and then filtered to concentrate the gel. The filter cake was given a carbonate-acid treatment and washed with 12 gallons of water to remove impurities. The alumina trihydrate content in the dried product was found to be 2% of which 67% was of the Bayerite type.

*Example VI*

To a solution of 0.197 gallon of 38% sodium aluminate in 1.63 gallons of water was added, over a 30-minute period, a solution prepared by dissolving 0.16 pound of sodium bicarbonate in 0.22 gallon of water. After agitating the mixture for an additional 30 minutes, a solution of aluminum sulfate, prepared by diluting 0.437 gallon of 25% aluminum sulfate solution with 1.58 gallons of water, was added over a 20-minute period. The pH of the resulting slurry was between 5.5 and 6.0. To this slurry was added dilute sodium aluminate (0.053 gallon of 38% sodium aluminate solution with 0.184 gallon of water) to adjust the batch to a final pH of 9.2 to 9.5. The temperature of the batch was 82° F. The slurry was filtered to concentrate the gel. The filter cake was given a carbonate-acid treatment and washed with 12 gallons of water to remove impurities. The trihydrate content of the dried product was found to be 12% of which 56% was of the Bayerite type.

*Example VII*

To a solution of 0.197 gallon of 38% sodium aluminate solution in 1.63 gallons of water was added, over a 30-minute period, a solution prepared by dissolving 0.48 pound of sodium bicarbonate in 0.65 gallon of water. After agitating the mixture for an additional 30-minute period, a solution of aluminate sulfate, prepared by diluting 0.455 gallon of 25% aluminum sulfate solution with 1.64 gallons of water, was added over a 20-minute period. The pH of the slurry was between 5.5 and 6.0. To this slurry was added dilute sodium aluminate (0.0544 gallon of 38% aluminate solution diluted with 0.187 gallon of water) to adjust the batch to a final pH of 5.5 to 6.0. The temperature of the batch was 82° F. The slurry was heated to 125° F. and filtered to concentrate the gel. The filter cake was given a carbonate-acid treatment and washed with 12 gallons of water to remove impurities. The trihydrate content of the dried product was found to be 25% of which 41% was of the Bayerite type.

*Example VIII*

To a solution of 0.197 gallon of 38% sodium aluminate solution in 1.63 gallons of water was added, over a 30 minute period, a solution prepared by dissolving 0.32 pound of sodium bicarbonate in 0.43 gallon of water. A solution of aluminum sulfate, prepared by diluting 0.422 gallon of 25% aluminum sulfate solution with 1.52 gallons of water, was then added over a 20 minute period. The pH of the resulting slurry was between 5.5 and 6.0. To this slurry was added dilute sodium aluminate (0.054 gallon of 38% aluminate solution with 0.22 gallon of water) to adjust the batch to a final pH of 9.2 to 9.5. The temperature of the batch was 81° F. The slurry was heated to 125° F. and filtered to concentrate the gel. The filter cake was given a carbonate-acid treatment and washed with 12 gallons of water to remove impurities. The trihydrate content of the dried product was found to be 13% of which 53% was of the Bayerite type.

*Example IX*

To a solution of 0.197 gallon of 38% sodium aluminate solution in 1.63 gallons of water was added, over a 30 minute period, a solution prepared by dissolving 0.32 pound of sodium bicarbonate in 0.43 gallon of water. After agitating the mixture for an additional 120 minutes, a solution of aluminum sulfate, prepared by diluting 0.422 gallon of 25% aluminum sulfate solution with 1.52 gallons of water, was added over a 20 minute period. The pH of the resulting slurry was between 5.5 and 6.0. To this slurry was added dilute sodium aluminate (0.064 gallon of 38% aluminate solution with 0.22 gallon of water) to adjust the batch to a final pH of 9.2 to 9.5. The temperature of the batch was 82° F. The slurry was heated to 125° F. and filtered to concentrate the gel. The filter cake was given a carbonate-acid treatment and washed with 12 gallons of water to remove impurities. The trihydrate content of the dried product was found to be 24% of which 46% was of the Bayerite type.

Example X

To a solution of 366 gallons of 38% sodium aluminate in 3040 gallons of water at 80° F. was added, over a 30 minute period, a solution prepared by dissolving 595 pounds of sodium bicarbonate in 800 gallons of water (at 80° F.). After allowing the resulting mixture to stand for 30 minutes, a solution of aluminum sulfate, prepared by diluting 785 gallons of 25% aluminum sulfate with 2825 gallons of water, was added over a 29 minute period. The pH of the resulting slurry was between 5.5 and 6.0. To this slurry was added dilute sodium aluminate (59.5 gallons of aluminate diluted with 200 gallons of water) to adjust the batch to a final pH of about 9.0. The slurry was filtered to concentrate the gel and then spray dried. The dried product was washed to remove impurities. The trihydrate content was found to be about 20%.

After forming into cylindrical pellets by extrusion, the alumina base prepared in Example X was employed as a support for a desulfurization catalyst (cobalt oxide and molybdenum oxide) and found to be highly sasitfactory.

Example XI

To a solution of 363 gallons of 38% sodium aluminate solution in 3000 gallons of Chicago tap water adjusted to 80° F., was added a solution of 750 pounds of sodium bicarbonate dissolved in 1000 gallons of water, this solution being added over a period of 30 minutes. The resultant mixture was agitated for an additional one and one-half hours. Subsequently, 970 gallons of 25% aluminum sulfate solution diluted with approximately 2000 gallons of water was added to the batch to adjust to a final pH of 5.5. The precipitated alumina was purified in the gel state by repeated reslurring and filtration. In the final product, the sodium salt content was 0.048.

The trihydrate content on batches prepared according to the above procedure reached from 25 to 30%.

The foregoing examples illustrate that alumina compositions containing controllable amounts of alumina trihydrate can be prepared by the process of this invention. The results obtained are reproducible when identical procedures and reagents are used. This has been demonstrated in Examples III and IV.

Examples IV, V, VI and VII illustrate that increasing amounts of alumina trihydrate are formed when increasing amounts of sodium bicarbonate are used in the ratio of 0.1 to about 0.6 part by weight of $NaHCO_3$ to one part by weight of aluminum calculated as $Al_2O_3$, employing the same time periods for admixing. The results obtained in these examples were plotted to give the curve of Fig. 1.

Examples VIII and IX illustrate the effect of the time of admixing on the amount of alumina trihydrate formed. The results obtained in these examples were plotted to give the curve of Fig. 2. The curve demonstrates that increasing amounts of trihydrate are formed with increasing time periods for admixing of the bicarbonate and aluminum salts.

The invention is particularly well adapted to the manufacture of extrudible alumina compositions where the trihydrate content must be kept to a certain maximum amount to obtain optimum catalytic activity. An illustration of such use of the method of this invention is Example X wherein the alumina product, containing 20% trihydrate, was successfully formed into cylindrical pellets by extrusion, after which the pellets were employed as a support for a desulfurization catalyst (cobalt oxide and molybdenum oxide) and then used successfully in a desulfurization reaction.

When the alumina base of this invention is used as a support for a desulfurization catalyst, the purified base should preferably contain no more than 0.06% by weight of sodium, 1.0% by weight of sulfate, and 0.4% by weight of silica.

The alumina herein described can be employed in association with magnesia as a cracking cataylst. The alumina base can be also used as a carrier for well known catalytic agents employed in catalytic cracking, dehydrogenation, hydrogenation, hydroforming, desulfurization, aromatization and reforming hydrocarbons. Among the catalytic agents which may be carried on alumina catalyst bases prepared as herein described are the oxides and other compounds of the related metals which have their differentiating electron in the second from the outermost shell (see W. F. Luder, Jour. of Chem. Ed., 16:394 (1939) for a description of the related metals). These metals are vanadium, manganese, zinc, scandium, iron, cobalt, chromium, copper, titanium, nickel, columbium, masurium, yttrium, rhodium, palladium, molybdenum, hafnium, ruthenium, zirconium, iridium, silver, lanthanum, platinum, thorium, mercury, uranium, gold, tungsten, cadmium, rhenium, tantalum, osmium, and actinium. The incorporation of these metals with the alumina base of the type herein described can be effected by a suitable treatment of the base with the sulfates, chlorides, nitrates, molybdenates, vanadates, chromates and other suitable salts by impregnation, precipitation, or according to suitable methods well known in the art. The alumina bases can also have incorporated therewith silica (e.g., 0.5% to 10% by weight of the alumina), zirconia, titania and/or thoria.

The alumina bases herein described are particularly suitable for use as carriers for the oxides or molecular combinations of chromium, molybdenum cobalt and vanadium. As an illustration, a carrier consisting essentially of an alumina gel of the type herein described can be used to support 1% to 12% of molybdenum oxide. Similar catalysts can be prepared containing as additional ingredients up to 10% of titania and/or iron oxide.

The invention is hereby claimed as follows:

1. A method for preparing a composition containing a controlled amount of gelatinous aluminum trihydrate which comprises admixing, in aqueous solution, an alkali metal bicarbonate and a soluble aluminate from the group consisting of sodium aluminate and calcium aluminate, the weight ratio of said bicarbonate to said aluminate salts, calculated as $Al_2O_3$, used in the preparation of said composition being within the range from 0.1 to 1.5 and the reaction time being sufficient to produce a product after drying in which the amount of aluminum trihydrate is within the range of 10% to 60% by weight of said product, reducing the pH of the resultant mixture to an acidic pH by adding to said mixture an acidic substance from the group consisting of sulfuric acid, hydrochloric acid, nitric acid and aluminum sulfate, thereafter raising the pH of the resultant mixture to an alkaline pH by adding sodium aluminate to said mixture, and separating the resultant solids containing aluminum trihydrate from said mixture.

2. A method for preparing a composition containing gelatinous aluminum trihydrate which comprises admixing in aqueous solution an alkali metal bicarbonate and a soluble aluminate from the group consisting of sodium aluminate and calcium aluminate, thereafter reducing the pH of the resultant mixture to an acidic pH by adding aluminum sulfate to said mixture, thereafter raising the pH of the resultant mixture to an alkaline pH by adding sodium aluminate to said mixture, and separating the resultant solids from the resultant mixture, the weight ratio of said bicarbonate to the aluminum slats, calculated as $Al_2O_3$, used in the preparation of said composition being within the range from 0.1 to 1.5 and the amount of aluminum trihydrate in the resultant product after drying being within the range of 10% to 60% by weight of said product.

3. A method for preparing an extrudible composition containing gelatinous alumina trihydrate which comprises admixing in aqueous solution sodium bicarbonate and sodium aluminate, thereafter reducing the pH of the resultant mixture to a pH within the range of 5 to 6 by adding aluminum sulfate to said mixture, thereafter raising the pH of the resultant mixture to a pH within the range of 9 to 9.5 by adding sodium aluminate to said mixture, and separating the resultant solids from the resultant mixture, the weight ratio of said bicarbonate to the aluminum slats, calculated as $Al_2O_3$, used in the preparation of said composition being within the range from 0.1 to 1.5 and the amount of alumina trihydrate in the resultant product after drying being within the range of 10% to 60% by weight of said product.

4. A method for preparing an alumina composition containing alumina trihydrate comprising admixing in aqueous solution a portion of sodium bicarbonate and a portion of sodium aluminate, then admixing with the resulting mixture a portion of aluminum sulfate, said aluminate being admixed over a time period of about 30 minutes to about 120 minutes and said sulfate being admixed with the mixture of said bicarbonate and said aluminate over a time period of about 15 minutes to about 40 minutes, the quantity of said sulfate being sufficient to reduce the pH of the resultant mixture to within the range of 5 to 6, thereafter adding an additional portion of sodium aluminate with agitation to the resultant mixture sufficient to raise to raise the pH to 9 to 9.5, then filtering, washing and drying, the said portions when combined amounting to 0.2 to 1.2 parts by weight of $NaHCO_3$ per part by weight of $Al_2O_3$.

References Cited in the file of this patent

UNITED STATES PATENTS

| | | |
|---|---|---|
| 2,247,624 | Wall | July 1, 1941 |
| 2,390,272 | Reismeyer et al. | Dec. 4, 1945 |
| 2,434,204 | Feachem | Jan. 6, 1948 |
| 2,446,799 | Winding | Aug. 10, 1948 |
| 2,657,115 | Ashley | Oct. 27, 1953 |

UNITED STATES PATENT OFFICE
CERTIFICATE OF CORRECTION

Patent No. 2,943,065                                June 28, 1960

David G. Braithwaite

It is hereby certified that error appears in the printed specification of the above numbered patent requiring correction and that the said Letters Patent should read as corrected below.

Column 7, lines 7 and 23, for "slats", each occurrence, read -- salts --.

Signed and sealed this 10th day of January 1961.

(SEAL)
Attest:

KARL H. AXLINE
Attesting Officer

ROBERT C. WATSON
Commissioner of Patents